United States Patent [19]
Williams et al.

[11] Patent Number: 5,502,745
[45] Date of Patent: Mar. 26, 1996

[54] BPSK MODULATOR FOR A DIGITAL SIGNAL TRANSMITTER

[75] Inventors: Bruce H. Williams, Sandy; Rov E. Greeff; Glenn A. Arbanas, both of Salt Lake City, all of Utah

[73] Assignee: Unisys Corp., Blue Bell, Pa.

[21] Appl. No.: 171,058

[22] Filed: Dec. 21, 1993

[51] Int. Cl.$^6$ ............................................. H04L 25/03
[52] U.S. Cl. ........................ 375/282; 375/308; 375/284; 332/103
[58] Field of Search ..................... 375/296, 308, 375/309, 282, 284; 332/103, 104, 144, 107

[56] References Cited

U.S. PATENT DOCUMENTS 4,930,141   5/1990   Ohmagari ................................. 375/60
5,162,763   11/1992  Morris ..................................... 332/170
5,172,394   12/1992  Kuster et al. ............................. 375/67
5,225,795   7/1993   Iinuma ..................................... 332/103

Primary Examiner—Stephen Chin
Assistant Examiner—Timothy J. May
Attorney, Agent, or Firm—John B. Sowell; Mark T. Starr

[57] ABSTRACT

An improved digital data modulator is provided for a digital transmitter. The digital data modulator comprises of a pair of digital data synthesizers which are controlled in a manner which produces complex conjugate modulated data signals of the input signals. Summing means are provided to sum the outputs of the digital data synthesizers in a manner which removes the imaginary components and simultaneously reduces the side load power without employing conventional filters.

9 Claims, 4 Drawing Sheets

BPSK MODULATOR FOR A DIGITAL SIGNAL TRANSMITTER

BACKGROUND OF THE INVENTION

1. Field of the Invention

The present invention relates to filter systems used in digital communication transmitters. More particularly, the present invention relates to an improved modulator employing direct digital synthesizers to create a designed waveform output which eliminates conventional filters in digital transmitters.

2. Description of the Prior Art

Data which is digital in nature such as NRZ, BPSK and QPSK, etc. has an infinite band width. When such data is to be transmitted, it must be limited in band width to comply with FCC requirements. The usual way of limiting the band width of such digital data at the transmitter is to filter the RF signal after the output of the modulator using band pass filters. Such RF band pass filters cannot be easily and accurately designed to control a narrow frequency band using conventional techniques. An alternative way of limiting the digital data is to filter the base band signal prior to input to the modulator. Such base band filters can only be used in conjunction with highly linear multipliers and amplifiers downstream from the digital modulator.

Accordingly, it would be highly desirable to eliminate convention signal shaping filters used in digital data transmitters.

SUMMARY OF THE INVENTION

It is a principal object of the present invention to provide a novel modulator for a digital signal transmitter.

It is a primary object of the present invention to provide a novel digital data modulator which effectively eliminates the need for conventional signal band width filters in digital transmitters.

It is a primary object of the present invention to provide a novel digital data modulator which permits dynamic programmable control of the frequency, power and phase output signal of the modulator.

It is a primary object of the present invention to provide a novel digital data modulator which eliminates distortions that would be caused by use of non-linear amplifiers.

It is a general object of the present invention to provide a novel modulator for a digital transmitter that is cheaper, smaller and more effective than prior art analog modulators.

It is a primary object of the present invention to provide a novel modulator for a digital transmitter that permits easier matching of the transmitted signal at the receiver.

According to these and other objects of the present invention, there is provided in a digital data transmitter a digital modulator for receiving the digital data stream and the data clock. The digital data modulator comprises a pair of digital data synthesizers adapted to receive an offset frequency control (OFC) bit signal and produce as an output signals comprising the carrier component of the data signal which may be summed as positive signals to provide the sum of two frequency shift keyed signals containing the data signal that is constrained in band width without the use of conventional filters.

DETAILED DESCRIPTION OF THE PREFERRED EMBODIMENTS

Figure 1:
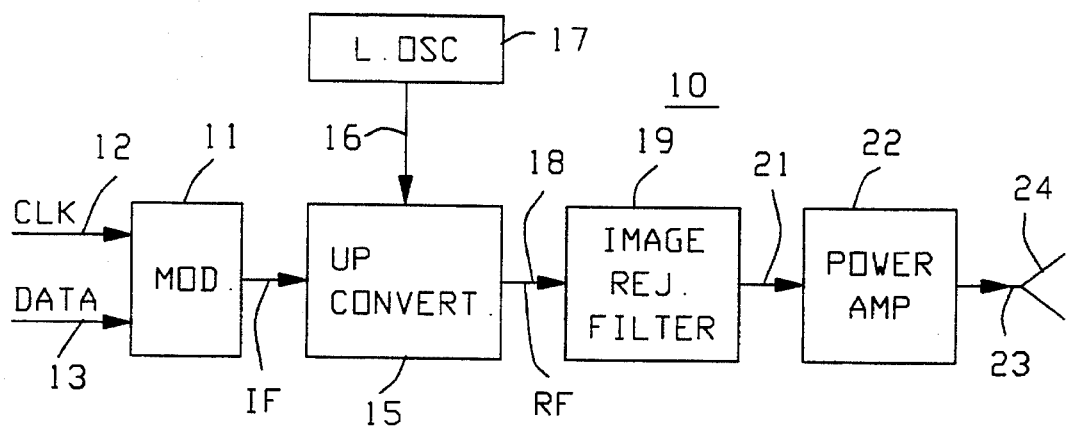
FIG. 1 is a schematic block diagram of a typical BPSK transmitter.

Refer now to FIG. 1 showing a schematic block diagram of a typical BPSK transmitter 10 comprising a modulator 11 having a clock input on line 12 and a data clock input on line 13. The output of the modulator 11 on line 14 is shown as an intermediate frequency (IF) signal which is applied as an input to an up converter 15 having a local oscillator input on line 16 from oscillator 17. The RF output signal on line 18 is shown being applied to an image rejection filter 19 which is not a shaping filter. The output of the image reject filter 19 on line 21 is applied to a power amplifier 22 to produce a BPSK modulated signal on line 23 which is transmitted via antenna 24.

Figure 2:
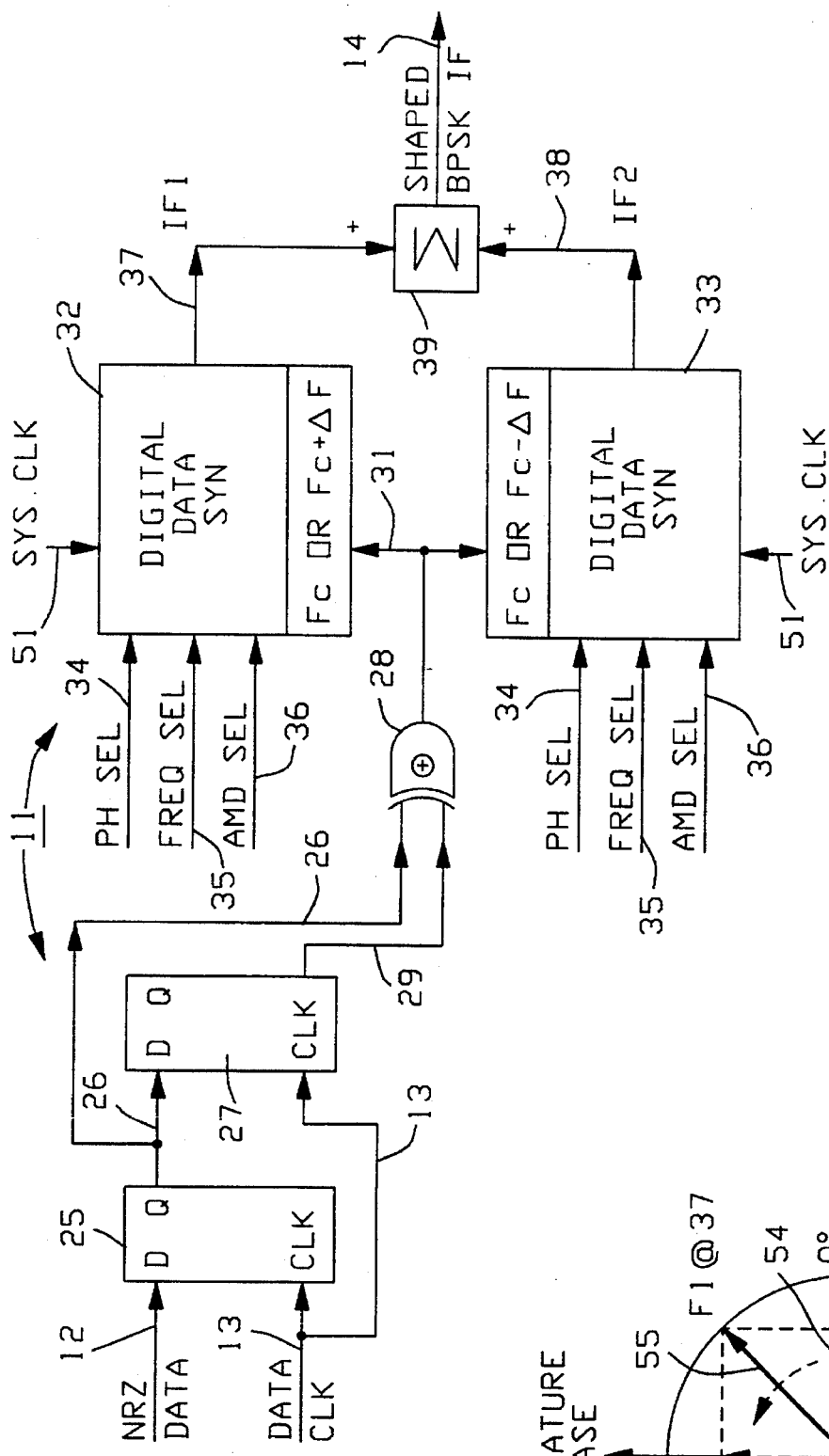
FIG. 2 is a more detailed schematic block diagram of a preferred embodiment digital modulator used in FIG. 1.

Refer now to FIG. 2 showing a more detailed schematic block diagram of a preferred embodiment digital modulator 11. The modulator 11 is shown having the digital data on line 12 and the data clock on line 13 being applied to a latch 25. The latch produces as its Q output on line 26 a delayed clock data signal similar to the signal on line 12. Line 26 is applied directly to the data input of latch 27 and further applied to one of the inputs of the exclusive OR gate 28 which is also shown having a Q output from latch 27 on line 29.

The combination of the latches 25, 27 and gate 28 produce on the output line 31 of gate 28 a differentially encoded data stream which is applied directly to a first configured digital data synthesizer 32 and a second digital data synthesizer 33. The offset control frequency signal on line 31 is processed by the digital data synthesizers 32 and 33 each having three programmable selective inputs shown on lines 34 to 36 as the phase select, the frequency select and the amplitude select control inputs. In the present invention two frequencies are loaded in registers of the DDS31 as the carrier $f_c$ and second frequency $f_c \pm \Delta f$. This allows rapid switching between the two frequencies of each DDS. The programmable select signals on lines 34 to 36 are substantially the same but may be different to achieve offset frequency adjustment of the carrier frequency. The digital outputs from the digital synthesizers on lines 37 and 38 are applied as positive signals to the input of the summing and combining circuit 39. The summing and combining circuit 39 in the preferred embodiment comprises a digital adder and a D to A converter which produces the desired analog signal on line 14 shown as the shaped BPSK IF signal. The preferred embodiment of the present invention embodies digital data synthesizers of the type available from Qualcomm in San Diego, Calif. or Stanford Telecommunications in Santa Clara, Calif. or Sitech in Silicon Valley, Calif. These well known digital devices perform the function of digital numerical control oscillators and also permit control of the amplitude, the frequency and the phase of the output carrier.

Figure 3:
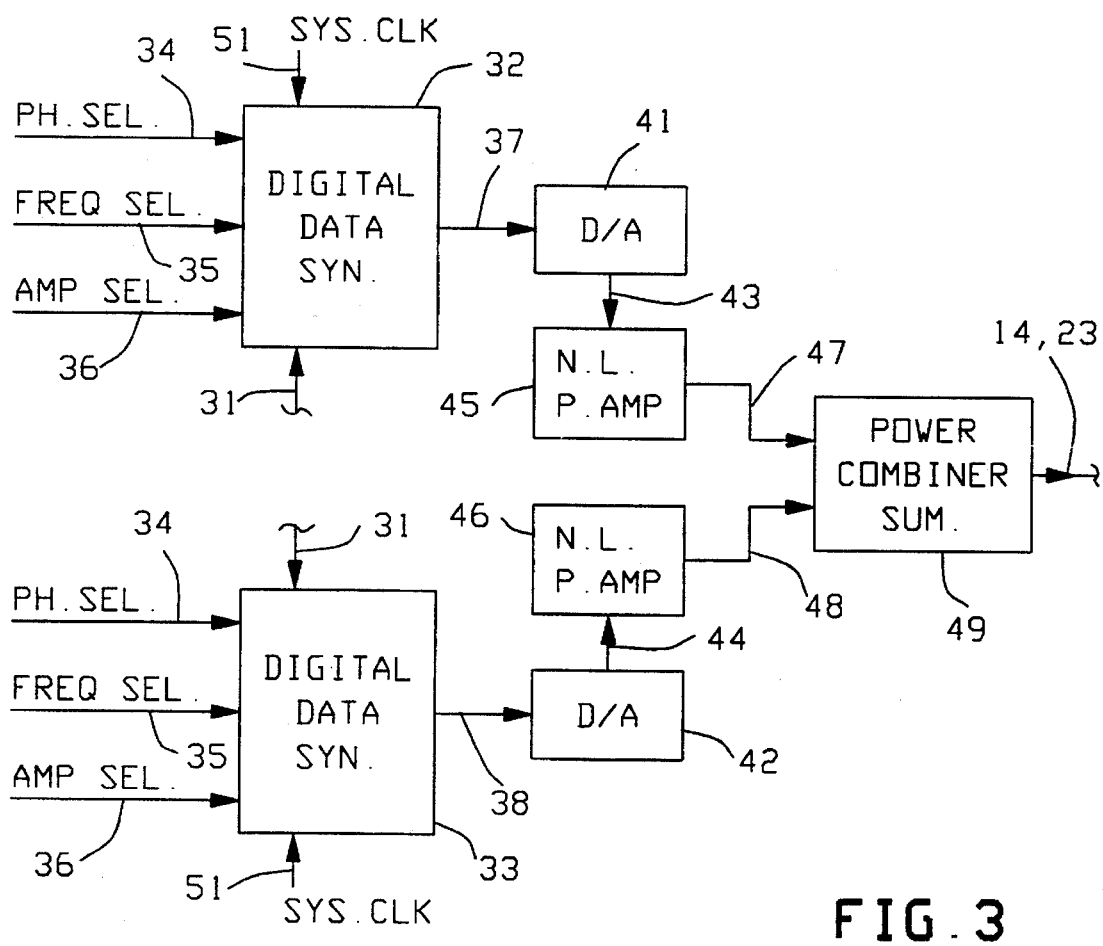
FIG. 3 is a more detailed block diagram of a modified preferred embodiment digital modulator used in FIG. 1.

Refer now to FIG. 3 showing a more detailed block diagram of a modified preferred embodiment digital modulator used in FIG. 1. The names and numbers applied to the elements in this drawing are identical to those applied to FIG. 2 and involve the same components thus do not require additional explanation. The digital outputs on lines 37 and 38 from the synthesizers 32 and 33 are shown being applied to a pair of D to A converters 41 and 42. The output of the D to A converters on lines 43 and 44 are applied to a pair of non-linear amplifiers 45 and 46 having outputs on lines 47 and 48 which are applied as inputs to the power combiner and summing circuit 49. The output of the power combiner 49 on line 14 is an analog signal which is free of the distortion which usually occurs when being amplified in non-linear amplifiers such as those shown in amplifiers 45 and 46. The systems clock shown on line 51 is a specified for the digital data synthesizer chips 31, 32 and comprises the highest frequency required for operation of the chip.

Figure 4:
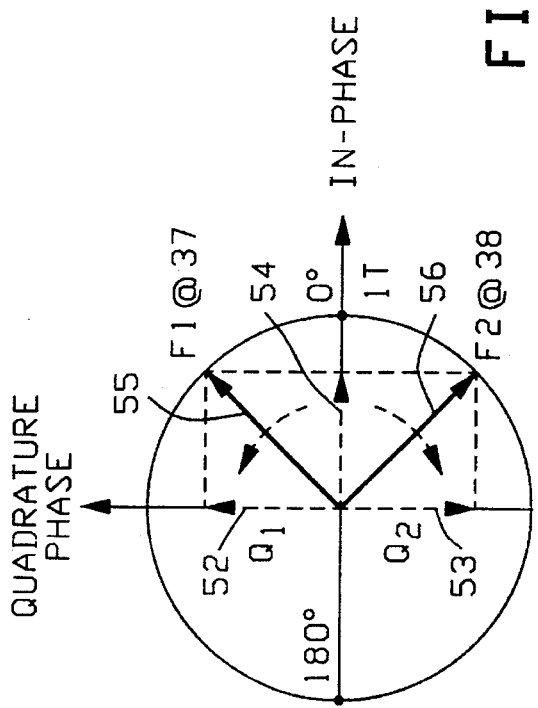
FIG. 4 is a schematic diagram of a phase constellation diagram of the modulated carrier signal in FIG. 1.

Refer now to FIG. 4 showing a schematic drawing of a phase constellation diagram of the modulated carrier signal. The quadrature component of the signal is shown as Q1 and by line 52. An opposite quadrature component is shown by Q2 and the line 53. The in phase components are shown at line 54. Accordingly, the IF1 vector 55 comprises a component 52 and 54. Likewise, the IF2 vector 56 comprises component 53 and 54. When these vectors IF1 and IF2 on lines 37 and 38 are combined, they eliminate the quadrature phase components and double the in phase component 54, thus producing the desired in phase output signal on line 14 shown in FIG. 2.

Figure 5:
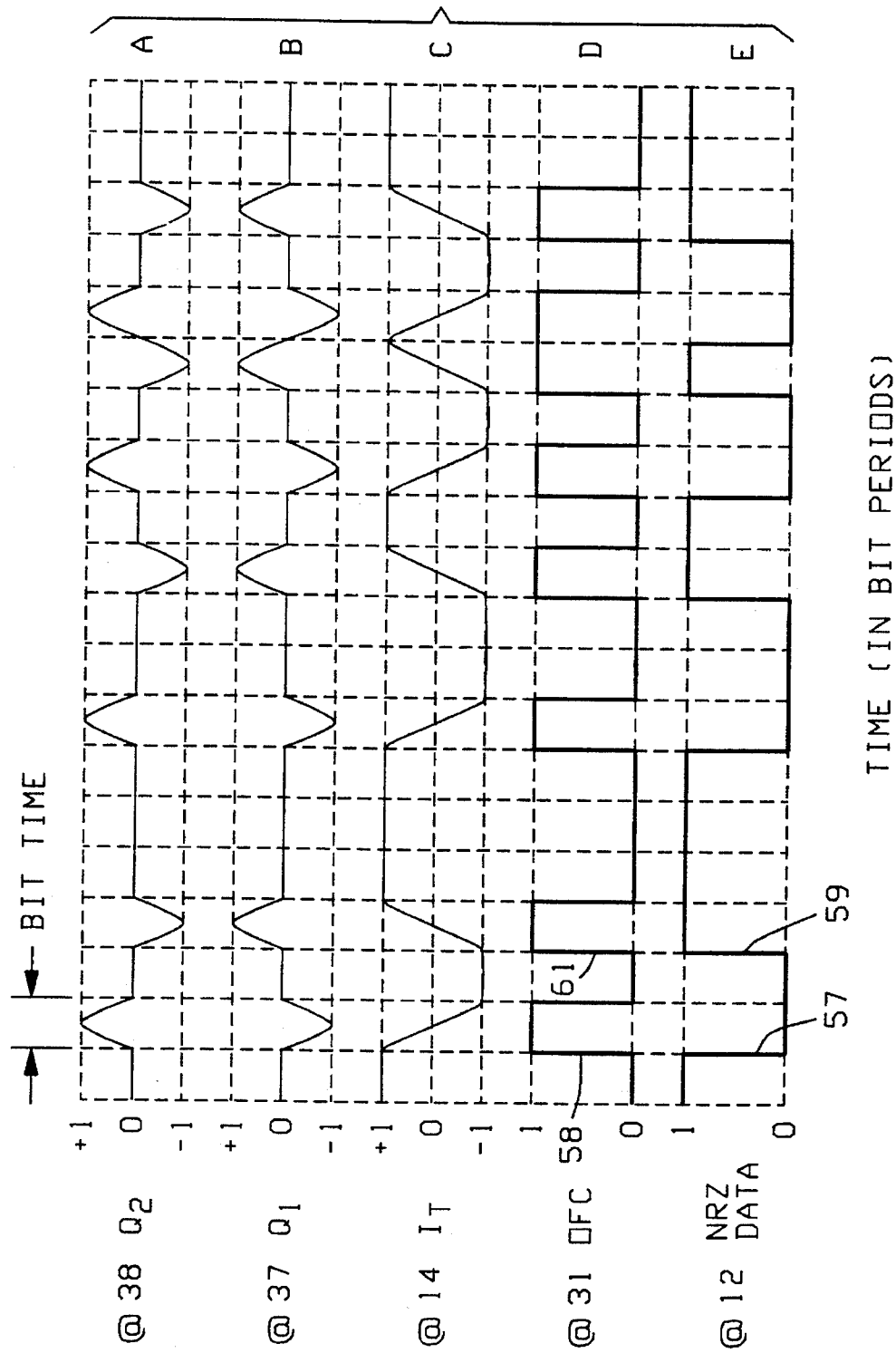
FIG. 5 is a schematic waveform diagram showing the signal being processed in the modulator of FIG. 2.

Refer now to FIG. 5 showing a schematic waveform diagram of the signals being processed in modulator 11 shown in FIGS. 1 and 2. The waveform A is the Q2 output shown on FIG. 4 and the Q1 output shown at B are the outputs at lines 38 and 37, respectively. When added, the quadrature components cancel each other resulting in an in phase waveform $I_T$ shown at waveform C that is produced at the output of line 14 comprising two in phase components similar to the component shown at 54 in FIG. 4. The offset frequency control (OFC) signal on line 31 is shown as waveform D. It will be noted that the signal on line 31 produces 180° phase transitions in each of the digital data synthesizers 32 and 33 at the bit time transitions. The FIG. 5 waveform E shows the input NRZ data on line 12 which is applied to the modulator 11. It will be noted that at each transition of the NRZ data in waveform E a digital frequency control signal is generated. Thus, the transition at point 57 causes the transition 58. Likewise, the transition 59 in the data causes the OFC transition 61 and each time the NRZ data incurs a transition, a similar transition or bit signal is produced at the input of the digital data synthesizers 32 and 33. Thus, the signals 58 and 61, etc. shown on the OFC line 31 cause the synthesizers 32 and 33 to rotate the carrier phase of the signal. By rotating the modulated signals in opposite directions and recombining the signals, the imaginary components Q1 and Q2 are eliminated, leaving only the real component shaped with a programmable shaped transition which will be explained in more detail hereinafter.

Figure 6:
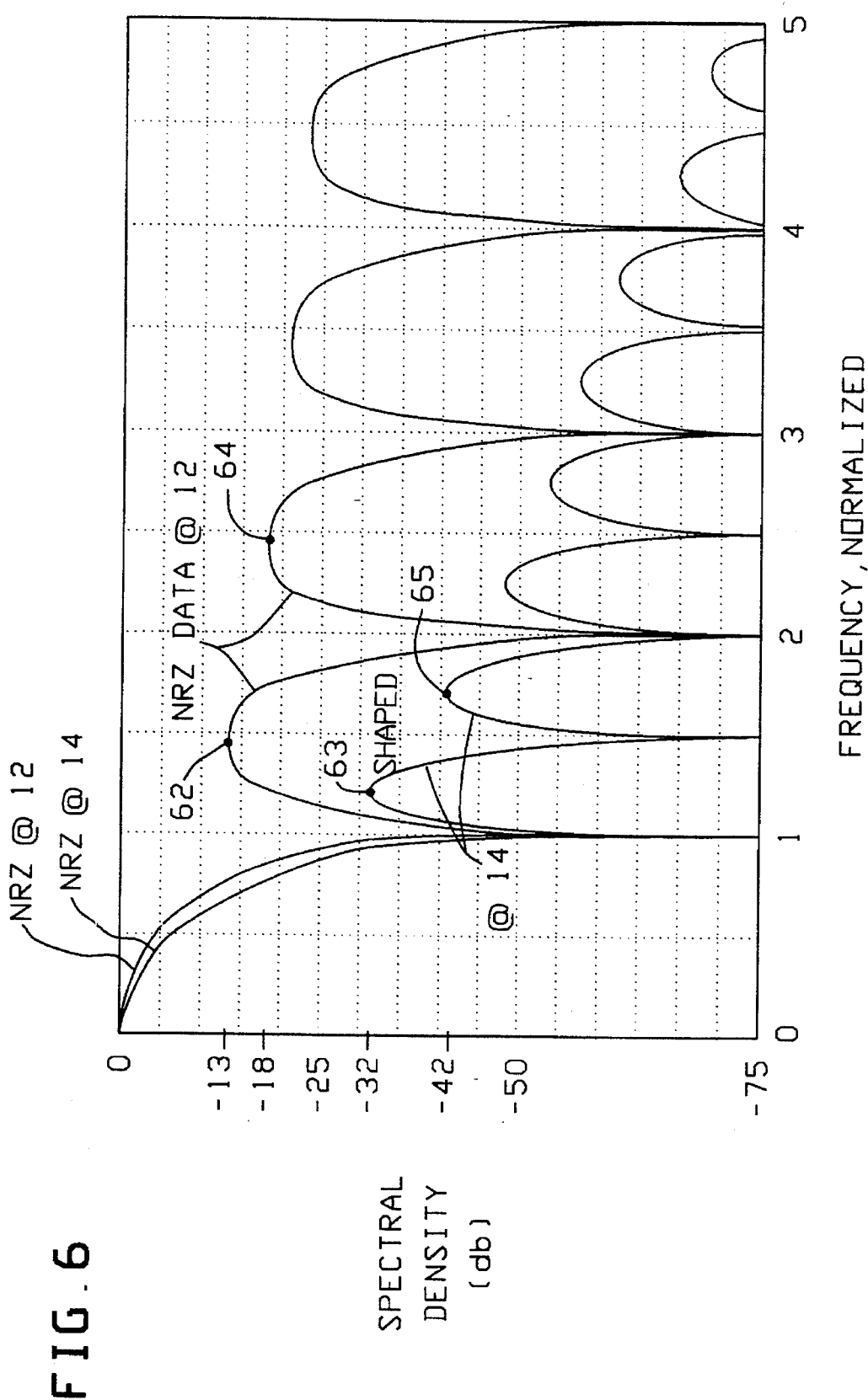
FIG. 6 is a schematic waveform drawing showing a comparison of the original data signal and the effectively filtered data signal at the output of the modulator.

Refer now to FIG. 6 showing a schematic waveform drawing which compares the original data signal on line 12 with the effective filtered and shaped signal on line 14. The left most wave components are the main lobes shown as the NRZ component at line 12 and the filtered NRZ component at line 14. The first side lobe of the NRZ data on line 12 is shown having a peak at point 62 which is down 13 decibels. In similar manner, the peak 63 of the first side load of the shaped component at line 14 is shown down −32 decibels. The second side lobe of the NRZ data at line 12 is shown by the peak 64 down −18 decibels. The second side lobe of the shaped waveform at line 14 is shown having a peak point 65 down −42 decibels. This comparison of the spectral density of the components of the signals being produced at lines 12 and 14 illustrates the fact that the novel digital data synthesizers 32 and 33 are effectively filtering the input signal and producing a modulated output having a limited band width which is more effective than that achieved heretofore using conventional filters.

Having explained a preferred embodiment of the present invention, it will be understood that the selective and programmable inputs on lines 34 to 36 may be employed to achieve shaped waveforms at line 14 which can easily be fitted within the spectral mask requirements issued by the FCC for digital data transmitted signals.

Having explained a preferred embodiment of the present invention, it will be understood that the digital data output from the novel modulator may be immediately converted to analog signals for further amplification in non-linear amplifiers without distortion of the shaped signal. Further, it will be appreciated that the digital data signals employed in the modulator of the embodiment shown in FIG. 2 can be processed as digital signals or digitally added and converted to analog signals for further processing in the transmitter circuit shown in FIG. 1 in a manner which permits miniaturization and cost reduction.

Having explained the preferred mode of operation in which the offset frequency control (OFC) signal is supplied on line 31 to select either the carrier frequency $F_c$ or the offset frequency $F_{O1}$ or $F_{O2}$, in the respective digital data synthesizers 32 and 33, it will be appreciated that an alternative and more complex way of selecting the offset frequency can be employed. The frequency of select signal on lines 35 may be controlled to select the offset frequency. In either case, the selection of the offset frequency is toggled by the offset frequency control signal on line 31 or no transition on line 31. Both of the digital data synthesizers produce the carrier frequency signal as an output on lines 37 and 38, respectively. When these carrier frequency signals are combined, there is no imaginary signal produced because they are complex conjugates of each other. In similar manner, digital data synthesizers 32 and 33 are producing the offset frequency signals $F_{O1}$ and $F_{O2}$, respectively, one is displaced from the carrier frequency $F_c$ by plus one-half the data rate and the other is displaced from the carrier frequency $F_c$ by minus one-half the data rate so that the outputs from the two digital data synthesizers are always rotating their vector components in opposite directions from each other and the quadrature components Q1 and Q2 are always opposite to each other so that the imaginary components cancel each other in the summing circuits. At the end of the rotation periods, the quadrature components Q1 and Q2 are in phase.

What is claimed is:

1. An improved digital data modulator for a digital signal transmitter, comprising:

latch means having an output coupled to a digital data stream and an input coupled to a digital data rate clock, said latch-means having a control signal output, a pair of digital data synthesizers, each said digital data synthesizer having a controlled input coupled to the output of said latch means, said latch means for selectably controlling the frequency offset of each digital data synthesizers, one of said digital data synthesizers being controlled to produce a digital data output signal offset from the carrier frequency $F_c$ by plus one-half of the data clock rate, the other of said digital data synthesizers being controlled to produce a digital data output signal offset from the carrier frequency $F_c$ by minus one-half the data rate clock rate, whereby the outputs of said pair of digital data synthesizers are complex conjugates of each other, and means for summing the outputs of said digital data synthesizers to produce a summed and shaped digital signal limited in band width without the need for conventional filters.

2. An improved digital data modulator as set forth in claim 1 wherein said latch means of said modulator further includes transition detector means having an input coupled to the digital data stream, said transition means having an output with a differential encoded data stream thereon.

3. An improved digital data modulator as set forth in claim 2 wherein said transition means comprise an exclusive OR gate.

4. An improved method of modulating digital data to reduce side lobe power components comprising the steps of:

providing a digital data rate clock, providing a pair of digital data synthesizers, generating a select signal from the digital data and said digital data rate clock, controlling one of said digital data synthesizers with said select signal to produce either the carrier frequency $F_c$ or an offset frequency $F_{01}$ output signal equal to the sum of $F_c$ or an offset frequency $F_{02}$ equal to the sum of $F_c$ plus one-half the data rate, controlling the other digital synthesizer with said select signal to produce either the carrier frequency $F_c$ or an offset frequency $F_{02}$ equal to the sum of $F_c$ minus one-half the data rate, and summing the outputs of said pairs of digital data synthesizers to provide a shaped modulated digital data signal having reduced and limited side lobe power without employing conventional filters.

5. An improved digital data modulator for a digital signal transmitter, comprising:

logic circuit means coupled to a source of digital data and to a data rate clock for producing an offset frequency control signal output, a pair of digital data synthesizers each having a controlled input coupled to said frequency control signal output for selectively controlling the digital frequency output of said digital data synthesizers, one of said digital data synthesizers being controlled to produce a digital output signal that is offset from the carrier frequency $F_c$ by plus one-half of the data clock rate, the other of said pair of digital data synthesizers being controlled to produce a digital data output signal that is offset from the carrier frequency $F_c$ by minus one-half the data rate clock, said output signals of said pair of digital data synthesizers being complex conjugates of each other, and means for summing the outputs of said digital data synthesizers to provide a summed and shaped digital signal limited in bandwidth without a need for conventional filtering.

6. An improved digital data modulator as set forth in claim 5 wherein said logic circuit means comprises means for differentially encoding said digital data from said source.

7. An improved digital data modulator as set forth in claim 6 wherein said means for differentially encoding said digital data comprises a pair of latches coupled to said source of digital data and to said data rate clock.

8. An improved digital data modulator as set forth in claim 7 wherein said logic circuit means further includes an exclusive OR gate coupled to the output of the differentially encoding means for producing said offset frequency control signal.

9. An improved digital data modulator as set forth in claim 5 wherein said data rate clock is coupled to said pair of digital data synthesizers to produce said carrier frequency ($F_c$) at radio frequency (RF), and said modulator further includes a digital to analog converter and a non linear amplifier coupled to the output of said pair of digital data synthesizers before said means for summing the output.

* * * * *